United States Patent [19]

Mitsuda et al.

[11] 4,396,636

[45] Aug. 2, 1983

[54] METHOD FOR PRODUCING FROZEN-FOOD

[75] Inventors: Hisateru Mitsuda, No. 64-1, Kamikamotakanawake-cho,, Kita-ku, Tokyo, Japan, 603; Saburo Ueno, Hirakata; Jinichi Itoh, Nagahama, both of Japan

[73] Assignee: Hisateru Mitsuda, Kyoto, Japan

[21] Appl. No.: 311,757

[22] Filed: Oct. 15, 1981

[30] Foreign Application Priority Data

Oct. 18, 1980 [JP] Japan ............................... 55-146084

[51] Int. Cl.$^3$ .......................... A23L 3/36; A23B 4/06
[52] U.S. Cl. .................................. 426/524; 426/393; 426/418
[58] Field of Search ..................... 426/524, 393, 418

[56] References Cited

U.S. PATENT DOCUMENTS 3,404,989 10/1968 Hirtensteiner ..................... 426/524
3,965,272 6/1976 Epstein et al. ..................... 426/524

*Primary Examiner*—Raymond N. Jones
*Assistant Examiner*—George C. Yeung
*Attorney, Agent, or Firm*—Brumbaugh, Graves, Donohue & Raymond

[57] ABSTRACT

Disclosed is a method for producing a frozen-food which comprises: the step of forming an ice-capsule, in which the food, initially at room temperature, is chilled with a freezing medium of −80° C. to −100° C. so as to form an ice-capsule surrounding the food within 15 minutes; the step of mild chilling, in which the food is chilled in an environment of −25° C. to −35° C. so that the temperature of the center of the food becomes about 0° C.; the step of quick chilling, in which the food is chilled with a freezing medium of −80° C. to −100° C. so that the temperature of the center of the food becomes about −6° C. or lower; and the step of freezing-storage, in which the food is chilled at a relatively mild temperature for a period of time and then stored at a temperature of −18° C. to −20° C. until consumed.

4 Claims, No Drawings

METHOD FOR PRODUCING FROZEN-FOOD

The present invention relates to a method for producing frozen-food from a fresh food, such as fish, shellfish or meat, or from a processed food such as "sushi" or "mochi".

Cold storage is used for preserving foods by preventing the deterioration of the foods by suppressing the action of enzymes, the growth of microorganisms, or the oxidation of food components. The lower the storage temperature, the more effective is the preservation. For this reason, freezing-preservation is the type of cold storage most generally used. When a food is frozen, ice crystals are formed in the food, causing changes in its tissue or colloidal tissue components. The formation of such ice crystals depends upon the rate of freezing at which the food is chilled from its initial temperature to its freezing point, as well as the freezing temperature at which the food is frozen. Thus, it is known that, in the production of a frozen-food, the quality of the frozen-food product is greatly influenced by the rate of freezing as well as the freezing temperature, and that slower-freezing results in larger ice crystals and thus in more detrimental changes in the food. For this reason, it is advisable to use quick freezing wherein the temperature quickly passes through the maximum ice crystal formation temperature zone, which is generally between $-1°$ C. and $-5°$ C., to reach the desired temperature for freezing-preservation.

However, a simple quick freezing is disadvantageous in that it produces a high temperature difference between the outer and inner portions of the food. Such temperature difference causes various disturbances in colloidal tissue organization in the inner portion of the food, such as change in pH, the salting out of the tissue components, or the denaturation of proteins, while, in the outer portion of the food, structural changes in the food such as mechanical damage or cell rupture will be caused. The temperature difference will also tend to accelerate the growth of ice crystals. In addition, the formation of ice crystals will cause displacement of the tissue components or food components because ice crystals are more voluminous than the water from which such ice crystals are formed, and such displacement will result in detrimental effects on the quality of the food. However, in most of the conventional methods for freezing-preservation of food, no particular care has been taken to overcome the above-mentioned disadvantages, and hence, it is said that frozen-foods are tasteless or unsavory.

It is therefore the primary object of the present invention to provide a method of producing frozen-food which preserves the initial qualities possessed by the food before being frozen.

The above and further objects and novel features of the present invention will be more fully understood from the following detailed description.

There are two different types of water occuring in food. One is bound water, the water which is present in the bound state with the protein or carbohydrate components of the food. The other is free water which is present in a unbound state and acts as a solvent for food components such as carbohydrates. Some of each type of such water is present in the extremely small spaces between the cells or within the cell structure, and the water present in such small spaces does not freeze easily. For example, it is found that water present in a 1 $\mu$m space is not frozen even at $-100°$ C. As mentioned earlier, smaller ice crystals are formed in quick freezing since, in chilling the food to the temperature for freezing, it is passed as rapidly as possible through the maximum ice crystal formation temperature zone. The present invention is directed toward an improvement of such freezing mode, that is, to the attainment of the conditions under which ice crystals are not either formed or are present as extremely fine ones. Theoretically, such conditions may be realized by maintaining the above mentioned small spaces in which free water or bound water is present, and so, the individual steps of the method of the present invention are aimed at the attainment of such conditions.

Thus, according to the present invention, there is provided a method of producing frozen-food which comprises the following steps: (A) the step of forming an ice-capsule, in which the food, initially at room temperature, is chilled with a freezing medium so as to form an ice-capsule surrounding the food, (B) the step of mild chilling, in which the food is chilled in an environment of $-25°$ to $-35°$ C. so that the temperature of the center of the food becomes about $0°$ C., (C) the step of quick chilling, in which the food is chilled with a freezing medium of $-80°$ C. to $-100°$ C. so that the temperature of the center of the food becomes about $-6°$ C. or lower, and (D) the step of freezing-storage, in which the food is stored at a temperature of $-18°$ C. to $-20°$ C. until consumed.

Now, each of these steps will be described below in a detailed manner.

(A) The step of forming an ice-capsule

This step is for chilling the food so as to form a rigid ice-capsule surrounding the food, by which the food is fixed so as to keep its external shape. This suppresses the expansion of the food due to freezing. Thus, during the freezing, the small spaces between the cells or within the cell structure are kept in their original state and number, and hence, the water (free water and bound water) present in such spaces is kept unfrozen when the food is chilled down through the maximum ice crystal formation temperature zone, or even if frozen, are present as extremely fine ice crystals (on the order of 10 $\mu$m) formed at the site of such spaces as dispersed throughout the food. Accordingly, the deterioration of the food, by the enzymes acting at such a low temperature as $-20°$ C. and/or the detrimental effects caused by the formation of large ice crystals can be effectively prevented. In addition, the ice-capsule is effective in the prevention of the growth of ice crystals and the evaporation of moisture components during the freezing-storage.

This step of chilling a food for forming an ice-capsule must be conducted in a rapid manner so that there is produced the least temperature difference between the outer and the inner portions of the food. Thus, the food is chilled with a freezing medium of a temperature of $-80°$ C. to $-100°$ C. so as to form the ice-capsule within 15 minutes, and preferably within 5 to 10 minutes. If the time for the formation of the ice-capsule exceeds 15 minutes, there will occur the detrimental effects as will be described below. As a matter of fact, the ice-capsule can be formed in various embodiments, depending upon the size and the shape of the food, as follows:

(1) With a relatively large-sized food, such as yellowtail or beef loaf, the food, initially at room temperature, is placed in an atmosphere of a chilling gas medium of a temperature of −80° C. to −100° C. (such as the gas from liquid nitrogen or dry-ice) and is sprayed, while being rotated, with water which may contain a glazing agent, for a period of 3 to 5 minutes so as to form an ice-capsule of a thickness of about 1 cm around the food.

(2) For a small-sized food, such as sardine, sweet smelt or shellfish, the ice-capsule is formed by direct immersion of the food into an aqueous solution containing a glazing agent, and then freezing the solution so as to form the ice-capsule on the surface of the food.

(3) For a food exhibiting less expansion from freezing, which is generally a processed or precooked food and of a relatively small size, such as "sushi" (a Japanese preparation of slightly vinegared rice overlayed or mixed with raw fish, shellfish, laver or vegetables) or "mochi" (a Japanese preparation, rice cake prepared from glutinous rice), such food is blown with a chilling medium such as gas from liquid nitrogen so that an ice-capsule is formed on the surface of the food due to the ice crystallization of the moisture present in air or of the water present in the outer portion of the food.

The ice-capsule thus formed is very rigid as it consists of innumerable fine ice crystals bonded together.

(B) The step of mild chilling

When the ice-capsule is formed around the food in accordance with the step (A) as described above, it is often the case that the temperature of the food inside the capsule is approximately 15° C. to 20° C. If such food is further chilled in an environment of a low temperature as employed in the step (A), the outer portion of the food is frozen while there is maintained such relatively high temperature in the center and in the neighbourhood of the center of the food, and hence, there occurs a high temperature gradient in the food.

Under such conditions, the freezing of water, particularly free water, progresses from the outer portion toward the inner portion of the food, resulting in a difference between the concentrations of aqueous solutions present outside and within the cells at the center of the food. Thus, due to osmosis, free water existing within the cells at the center of the food transfers through the cell membrane toward the outer portion of the food, and, such phenomenon accelerates the production and growth of ice crystals in the outer portion of the food. Thus, there occur the structural changes of the food, such as mechanical damage of the cells or cell rupture, particularly in the outer portion of the food. Furthermore, the freezing of water in the food causes changes in pH of the solution existing in the food, which results in various disturbances in the colloidal tissue, such as dehydration damage, salting out of the tissue components and the ice-crystallization of bound water, particularly in the inner portion of the food.

According to the present invention, these disadvantages can be prevented by elevating, immediately after the formation of the ice-capsule, the temperature of the environment of the food to a temperature of −25° C. to −35° C. and chilling the food at that temperature for a certain period of time, generally in the range of 5 to 30 minutes depending upon the size and character of the food. Through such a mild chilling, the food is gradually chilled, without producing much of a temperature difference between the outer portion and the center of the food, so that the temperature of the center of the food becomes about 0° C. or, more particularly 0° C.±1° C. The food is thus ready for the quick chilling to be conducted in the following step. The ice-capsule holds its initial rigidity so as to protect the food from the environment.

(C) The step of quick chilling

This step is for chilling the food in such a way that it is passed as rapidly as possible through the maximum ice crystal formation temperature zone (−1° C. to −5° C.). Thus, the food is chilled with a freezing medium of a temperature of −80° C. to −100° C. for a period of time, generally in the range of 7 minutes to 10 minutes, so that the temperature of the center of the food becomes about −6° C. or lower.

As mentioned, owing to the steps prior to this quick chilling, the food has already been protected by the ice-capsule so that the spaces between the cells or within the cell structure will be kept even during the freezing, and has reached a temperature of about 0° C., that is, just ready for being frozen. Accordingly, the food can be frozen, through the step of this quick chilling, in such a manner that it is passed through the maximum ice crystal formation temperature zone while having as much as possible the free water and bound water in the spaces unfrozen. Thus, such detrimental effects as mechanical damage or cell rupture can be prevented.

(D) The step of freezing-storage

This step is for storing the food in the frozen state until consumed.

When the food is subjected to the quick chilling as in step (C) above, there occurs a certain degree of temperature gradient in the food, for example, a temperature of −6° C. exists in the center of the food when in the outer portion of the food the temperature is −15° C. Accordingly, keeping the food under such severe conditions will cause changes in the structure or colloidal tissue components of the food, as described with respect to step (B) above. Further, the changes become irreversible because, for example, protein undergoes the change in its distribution in the food, due to the formation of ice crystals, and is susceptible to reaction with components other than water.

Thus, according to the present invention, subsequent to the quick chilling as in the step (C), the food is chilled at a relatively mild temperature so that the temperatures of the outer portion and the center of the food are equalized, and the food is stored so as to maintain such equalized temperature. More specifically, following the quick chilling, the temperature of the food environment is changed to −25° C. to −35° C. and maintained at that temperature for a certain period of time, generally for 40 to 90 minutes, so that the food reaches the equilized temperature of −18° C. to −25° C., and then, the food is stored at a temperature of −18° C. to −20° C. until consumed. For a certain types of food, for example, tuna meat, it is preferable to chill the food, following the quick chilling in step (C), to such a low temperature as −45° C. to =72° C., so as to completely suppress the action of the enzymes, and then, to store the same food at the specified temperature, i.e., at −18° C. to −20° C.

During this step of freezing-storage according to the present invention, a part of the free water and bound water in the food are frozen, when the food passes through the temperature range of −8° C. to −12° C., into fine ice crystals on the order of 10 μm which are homogeneously dispersed throughout the food without disturbing the such components of the food as protein. When the food is defrosted, such ice crystals revert to free water at their original sites, or revert to bound water which again combines with protein, and thus, the changes in the food components before and after the freezing are reversible. By the storage of the food at the specified temperature according to the present invention, enzyme actions in the food and changes in pH of liquor in the food can be almost completely prevented. In addition, the disturbance of colloidal tissue components of the food is prevented during such storage at the specified temperature.

The present invention, particularly the advantageous effects thereby, will be understood more readily by reference to the following examples.

EXAMPLE 1

In a cooling box kept at 15° C., there was provided a stainless steel dish, the demension of which were 40 cm in length, 20 cm in width and 5 cm in depth. Three pieces of ham, each 10 cm × 10 cm × 3 cm and weighing 300 g, were fixed in said dish with 1 cm spacer means therebetween. A glazing solution containing a vegetable polysaccharide or a gelatine was introduced into the dish so that the pieces of meat were wholly submerged in the solution in the dish. Nitrogen gas having a temperature of −80° C. was blown into the solution for 5 minutes so as to form a rigid ice-capsule surrounding the surface of each piece of meat. The pieces were pulled up from the solution and the atmosphere in the box was changed to a temperature of −25° C. and maintained at that temperature for 15 minutes so that the each piece was gradually chilled without producing much temperature difference between the outer portion and the center thereof, to finally reach 0° C. at its center. Then, nitrogen gas of −80° C. was continuously blown onto each piece for 5 minutes so that the center thereof became −6° C. Then, the temperature of the gas blowing onto the pieces was changed to −25° C. and maintained at that level for 60 minutes so that each piece was gradually chilled down to reach −20° C. at its center. Then, these meat pieces were transferred into a common type of freezing box and stored therein at the temperature of −18° C. for 6 months.

As controls, three pieces of ham meat, each having the same dimensions and weight as the ones treated by the method of the present invention in the above, were subjected to airfreezing (a type of slow freezing) at −35° C. for 24 hours. Then, the pieces thus frozen were stored, each packaged in a polyethylene bags having a thickness of 40 μm, in the freezing box for 6 months at −18° C. Similar operations were also conducted by means of air-blast freezing (a type of quick freezing) and contact freezing (a type of quick freezing).

After storage, these frozen-products produced by the method of the present invention and by the conventional freezing methods were defrosted at 3° C. under vacuum and were examined as to the amount of dripping, the color, the softness, the degree of cell rupture, and flavor, with the results as summarized in Table I, for the average of the three pieces of meat frozen by each method.

TABLE I

| Method for production of frozen-food | Dripping (A) | Color (B) | Softness (C) | Cell rupture (D) | Flavor (E) |
|---|---|---|---|---|---|
| Present invention | 1.2 | 4.5 | 5.0 | 0.5 | 4.5 |

TABLE I-continued

| Method for production of frozen-food | Dripping (A) | Color (B) | Softness (C) | Cell rupture (D) | Flavor (E) |
|---|---|---|---|---|---|
| Air freezing (at −35 C., for 24 hours) | 7.5 | 3.0 | 2.0 | 5.0 | 2.0 |
| Air-blast freezing (at −35 C., for 24 hours) | 6.3 | 3.0 | 3.0 | 4.5 | 2.0 |
| Contact freezing (at −35 C., for 24 hours) | 5.2 | 3.5 | 3.5 | 4.5 | 2.5 |

Remarks:
A: The amount of dripping is expressed in terms of the ratio by weight percentage of the amount of watery material exuded from the meat when the frozen meat was defrosted, to the weight of the meat before the freezing,
B: The color of the meat was evaluated by observing the defrosted meat in comparison with the meat prior to the freezing, using the following criteria:
5 (no color change),
4 (slight change),
3 (moderate change; barely marketable),
2 and 1 (much change; not marketable).
C: The softness of the meat was evaluated using the following criteria:
5 (the same as the fresh meat before freezing),
4 (slightly softened due to dehydration),
3 (moderately softened due to dehydration; barely marketable),
2 and 1 (unmarketable).
D: The examination of the degree of cell rupture was made by observing, under a microscope, a piece of the defrosted product and the result was evaluated using the following criteria:
1 (the occurence of slight cell rupture as compared with the fresh meat prior to freezing),
2 (moderate cell rupture),
3 (considerable cell rupture),
4 and 5 (much cell rupture).
E: The flavor of each defrosted piece of meat was tested after frying and classified according to the following criteria:
5 (the same as the fresh meat before the freezing),
4 (slight reduction in flavor as compared with the fresh meat),
3 (moderate reduction in flavor),
2 (considerable reduction in flavor; barely marketable),
1 (unmarketable).

It is understood that the frozen meat produced by the method of the present invention was preserved substantially with the initial qualities it possessed before being frozen, even after a storage period of as long as 6 months.

EXAMPLE 2

In a cooling box kept at 15° C., three eels, each weighing 100 g, and three young yellowtails, each weighing 1.1 kg, were slaughtered, and then sprayed with a glazing solution containing a vegetable polysaccharide or a gelatine, while being rotated on stainless wires. Nitrogen gas of −100° C. was blown onto each fish for 8 minutes so that a rigid ice-capsule of a thickness of 1 cm was formed surrounding the surface of each fish. The temperature of atmosphere in the chilling box was then changed to −30° C. and maintained at that level for 30 minutes so that each fish was gradually chilled without producing much temperature difference between the outer portion and the center thereof, to finally reach 0° C. at its center. Then, each fish was subjected to the step of quick chilling by blowing nitrogen gas of −100° C. for 10 minutes so that the center became −8° C., with each eel, and −6° C., with each young yellowtail, respectively. The temperature of the gas blowing onto the fishes was then changed to −32° C. and maintained at that level for 90 minutes so that each fish was chilled to reach −25° C. at its center. The fishes were transferred into a common type of freezing box and stored therein at −18° C. for one year.

As controls, nine eels and nine young yellowtails, each having the same weight as the ones treated by the present invention above, were, three each, subjected to air freezing, air-blast freezing and contact freezing, respectively, each at −35° C. for 24 hours, just after being slaughtered. Then, each fish, packaged by a polyethylene bag of a thickness of 40 μm, was stored for one year in the freezing box at −18° C.

After the completion of storage, the frozen fishes produced by the present invention and the frozen fishes are controls produced by the conventional freezing methods were defrosted at 3° C. under vacuum, and were examined as to the amount of dripping, color, softness, the degree of cell rupture, and flavor. The degree of cell rupture was examined, with a meat piece of each defrosted fish at the depth of 5 cm from the back skin. The flavor of each defrosted eel was tested after broiling seasoned meat, while the flavor of each defrosted yellowtail was tested as "sashimi", sliced raw meat without any cooking. The results are given in Table II. It is understood that the frozen fishes produced by the present invention have substantially the same qualities as fresh fishes before being frozen.

outer portion and the center thereof, to finally reach 0° C. at its center. Then, the temperature for chilling was changed to −100° C. and maintained at that level for 5 minutes so that the center of each hyporhamphus became −10° C. and that of each ligament became −8° C. Then, the temperature of the gas blowing onto the foods was changed to −30° C. and maintained at that level for 40 minutes so that each food is gradualy chilled to reach −20° C. at its center. Then, these foods were stored at −18° C. for eight months, with each being packaged by a polyethylene bag having a thickness of 40 μm.

As controls, nine hyporhamphus and nine ligaments, each having the same weight as the ones treated by the present invention above, were, three each, subjected to air freezing, air-blast freezing and contact freezing, respectively, each at −35° C. for 24 hours. Then, each food, packaged by a polyethylene bag of a thickness of 40 μm, was stored for eight months in the freezing box at −18° C.

TABLE II

|  | Dripping | | Color | | Softness | | Cell rupture | | Flavor | |
| --- | --- | --- | --- | --- | --- | --- | --- | --- | --- | --- |
|  | Eel | Young Yellowtail | Eel | Young Yellowtail | Eel | Young Yellowtail | Eel | Young Yellowtail | Eel | Young Yellowtail |
| Present Invention | 1.0 | 0.8 | 5.0 | 5.0 | 5.0 | 5.0 | 0.5 | 0.3 | 4.5 | 4.5 |
| Air freezing (−35° C., 24 hours) | 4.5 | 4.8 | 3.5 | 3.8 | 2.0 | 2.5 | 4.0 | 3.5 | 2.0 | 2.5 |
| Air-blast freezing (−35° C., 24 hours) | 4.0 | 3.6 | 4.0 | 4.0 | 2.0 | 3.0 | 3.5 | 3.5 | 2.5 | 2.5 |
| Contact freezing (−35° C., 24 hours) | 3.8 | 3.5 | 4.0 | 4.0 | 3.0 | 3.8 | 3.5 | 3.0 | 3.0 | 3.0 |

The criteria for qualities are the same as in Table I.

EXAMPLE 3

Three hyporhamphus immediately after landing, each weighing 8 g, and three fresh scallop ligaments, each weighing 37 g, were placed each in a stainless dish (15 cm in width×30 cm in length×3 cm in depth) located in a chilling box whose atmosphere was kept at 15° C. A glazing solution containing a vegetable polysaccharide or gelatine was introduced into the dish so that each hyporhamphus and ligament was wholly submerged in the solution in the dish. Nitrogen gas having a temperature of −100° C. was blown into the solution for 15 minutes so that a rigid ice-capsule was formed surrounding each hyporhamphus and ligament so as to be fixed for keeping its external shape. The atmosphere in the chilling box was changed to a temperature of −25° C. and maintained at that temperature for 15 minutes so that each food was gradually chilled without producing much temperature difference between the After the storage, the frozen products produced by the present invention and by the conventional freezing methods were defrosted at 3° C. under vacuum, and were examined as to the amount of dripping, color, softness, the degree of cell rupture, and flavor. The flavor of each ligament was tested after frying with butter, while the flavor of each hyporhamphus was tested as "sashimi". The results are summarized in the table III, in which the criteria for food qualities are the same as those in table I. It is understood that the frozen-foods produced by the present invention preserve the initial qualities possessed by the foods before being frozen.

TABLE III

|  | Dripping | | Color | | Softness | | Cell rupture | | Flavor | |
| --- | --- | --- | --- | --- | --- | --- | --- | --- | --- | --- |
|  | hypor-hamphus | liga-ment | hypor-hamphus | liga-ment | hypor-hamphus | liga-ment | hypor-hamphus | liga-ment | hypor-hamphus | liga-ment |
| Present Invention | 1.2 | 1.5 | 4.8 | 5.0 | 4.7 | 4.8 | 0.7 | 0.2 | 4.5 | 5.6 |
| Air freezing (−35 C., 24 hours) | 12.5 | 15.7 | 3.0 | 3.0 | 2.2 | 2.5 | 4.0 | 3.6 | 2.0 | 3.0 |
| Air-blast freezing (−35 C., 24 hours) | 10.4 | 10.5 | 3.4 | 3.5 | 3.1 | 3.2 | 4.0 | 3.3 | 2.8 | 3.5 |
| Contact freezing (−35 C., 24 hours) | 8.7 | 10.2 | 3.5 | 3.5 | 3.0 | 3.7 | 3.8 | 3.3 | 2.8 | 3.5 |

EXAMPLE 4

Three pieces of "tuna-sushi" (vinegared rice lump overlaid with a piece of raw tuna meat) each weighing 40 g and three pieces of "laver-sushi" (vinegared rice roll rolled in a sheet of laver) each weighing 100 g were placed on a stainless steel plate located in a chilling box whose atmosphere was kept at 20° C. Nitrogen gas of −100° C. was blown onto each "sushi" piece for 10 minutes so that an ice-capsule was formed surrounding the individual rice grains, tuna meat and laver, respectively, due to the ice-crystallization of the water present in the air of the chilling box and the free water present in the outer portions of these food materials. The temperature of the atmosphere in the chilling box was changed to −30° C. so as to gradually chill each piece of the "sushi" for 15 minutes until the center of each reached −1° C. Then, each "sushi" piece was blown with nitrogen gas of −100° C. for the period of 5 minutes so that the center thereof became −10° C. The temperature of the gas blowing onto the "sushi" pieces was then changed to −30° C. and maintained at that level for 40 minutes so that each "sushi" piece was gradually chilled down to reach −23° C. at its center. The pieces of "sushi" were removed from the chilling box and then stored, with each being packaged in a polyethylene bag having a thickness of 40 μm, in a common-type of freezing-storage box at −18° C. for one year.

As controls, nine pieces of the "tuna-sushi" and nine pieces of the "laver-sushi", each having the same weight as the ones treated by the present invention above, were, three each, subjected to air freezing, air-blast freezing and contact freezing, respectively, each at −35° C. for 24 hours, with each "sushi" being wrapped in a Japanese paper. Then, each piece of "sushi", packaged by a polyethylene bag of a thickness of 40 μm, was stored for one year in the freezing-storage box at −18° C.

After the completion of storage, the frozen "sushi", produced by the method of the present invention and by the conventional methods were allowed to stand at a temperature of 25° C. for one hour for natural thawing. The quality of each unfrozen "sushi" was examined for such properties as retention of shape when pressed by the fingers, the stickiness between each of the rice grains, the degree of gelatinization of the rice starch, palatability, and color. The results are summarized in Table IV, below.

TABLE IV

|  | Retention of shape (A) | | Stickiness between rice grains (B) | | Degree of Gelatinization (%) | | Palatability | | Color | |
| --- | --- | --- | --- | --- | --- | --- | --- | --- | --- | --- |
|  | tuna-sushi | laver-sushi | tuna-sushi | laver-sushi | tuna-sushi | laver-sushi | tuna-sushi | laver-sushi | tuna-sushi | laver-sushi |
| Present Invention | 4.5 | 5.0 | 5.0 | 5.0 | 88.5 | 90.2 | 4.8 | 5.0 | 4.5 | 5.0 |
| Air freezing (−35 C., 24 hours) | 2.0 | 2.0 | 2.1 | 1.8 | 17.8 | 18.5 | 1.5 | 1.8 | 2.5 | 3.0 |
| Air-blast freezing (−35 C., 24 hours) | 2.0 | 2.0 | 2.0 | 1.8 | 22.5 | 21.4 | 2.0 | 2.0 | 3.0 | 3.0 |
| Contact freezing (−35 C., 24 hours) | 2.0 | 2.0 | 2.3 | 2.2 | 23.1 | 22.4 | 2.0 | 2.0 | 3.0 | 3.0 |

Criteria for qualities:
A (Retention of shape when pressed by fingers):
5 (the same as fresh "sushi" before freezing),
4 (slightly deformed from shape of fresh "sushi"),
3 (moderately deformed from shape of fresh "sushi"),
2 and 1 (crumbly; unmarketable).
B (Stickiness between rice grains):
5 (the same as fresh "sushi"),
4 (slightly weaker than fresh "sushi"),
3 (moderately weaker than fresh "sushi"),
2 and 1 (crumbly, no stickiness).
C (Degree of gelatinization of rice starch):
According to the "glucoamylase method" as described in "Bullution of Japanese Agricultural Chemistry Society of Japan", 48 page 663 (1974).
D (Palatibility):
5 (the same as fresh "sushi"),
4 (slightly inferior to fresh "sushi"),
3 (moderately inferior to fresh "sushi"),
2 and 1 (unpalatable).
E (Color):
5 (no change in the colors of the tuna meat and the laver),
4 (slight deterioration in the colors),
3 (moderate deterioration in the colors),
2 and 1 (much deterioration in the colors, unpleasant as a food).

EXAMPLE 5

Three pieces of "mochi", each weighing 100 g, were placed on a stainless steel plate located in a chilling box whose atmosphere was kept at 22° C. Nitrogen gas of −100° C. was blown onto each "mochi" for 8 minutes so that a rigid ice-capsule was formed surrounding each "mochi" due to the ice-crystallization of the water present in the air of the chilling box and that present in the outer portion of the "mochi". The temperature of the atmosphere in the chilling box was changed to −30° C. and maintained at that level for 15 minutes so as to gradually chill each "mochi" until the center of each reached 0° C. Then, nitrogen gas of −100° C. was blown onto each "mochi" for 7 minutes so that the center thereof became −12° C. The temperature of the gas blowing onto the "mochi" pieces was then changed to −30° C. and maintained at that level for 50 minutes so that each "mochi" piece was gradually chilled down to reach −25° C. at its center. The pieces of "mochi" were then transferred into a common type of freezing box and stored therein for one year at −18° C., with each being packaged in a polyethylene bag having a thickness of 40 μm.

As controls, nine pieces of "mochi", each having the same weight as the ones treated by the present invention above, were, three each, subjected to air freezing, air-blast freezing and contact freezing, respectively, each at −35° C. for 24 hours. Then, each piece of "mochi", packaged in a polyethylene bag of a thickness of 40 μm, was stored for one year in the freezing box at −18° C.

After the storage, these frozen "mochi", produced by the present invention and by the conventional freezing methods, respectively, were allowed to stand at 25° C. for one hour for natural thawing. The quality of each "mochi" was then examined, for such properties as the degree of deformation when pressed by the fingers and restoration (A), palatability when eaten as it is without any cooking (B), color (C), and flavor (D), with the results as shown in Table V. It is seen that the frozen "mochi" produced by the present invention has substantially the same quality as the one as it is just prepared before freezing.

TABLE V

|  | (A) | (B) | (C) | (D) |
|---|---|---|---|---|
| Present Invention | 4.8 | 5.0 | 5.0 | 4.8 |
| Air freezing (−35 C., 24 hours) | 3.0 | 2.7 | 2.2 | 2.5 |
| Air-blast freezing (−35 C., 24 hours) | 3.3 | 3.2 | 2.8 | 3.0 |
| Contact freezing (−35 C., 24 hours) | 3.5 | 3.5 | 3.0 | 3.3 |

Criteria for qualities:
A:
5 (the same as fresh "mochi" before freezing),
4 (slightly inferior to fresh "mochi"),
3 (moderately inferior to fresh "mochi"),
2 and 1 (extremely inferior to fresh "mochi"),
B:
5 (the same as fresh "mochi" before freezing),
4 (slightly inferior to fresh "mochi"),
3 (moderately inferior to fresh "mochi"),
2 and 1 (extremely inferior to fresh "mochi"),
C:
5 (no change in color),
4 (slight deterioration in color),
3 (moderate deterioration in color),
2 and 1 (much deterioration in color),
D:
5 (the same as fresh "mochi" before freezing),
4 (slightly inferior to fresh "mochi"),
3 (moderately inferior to fresh "mochi"),
2 and 1 (extremely inferior to fresh "mochi").

As seen from the above description, particularly from the working examples, according to the present invention there can be produced frozen-foods, not only from fresh foods such as fresh fish, shellfish or meat, but also from processed (precooked or prepared) foods, while preserving the initial food qualities even after the foods are stored for such a long period of time as six months to one year. For example, frozen food from fresh fish, shellfish or meat produced by the present invention exhibits an extremely small amount of dripping (only about 1%) when thawed, which is a remarkable advantage over any frozen food produced by the conventional methods. Furthermore, while it has been hitherto impossible to produce a frozen-food of good quality from a particular types of processed food such as "sushi" or "mochi", the method of the present invention makes it possible to produce a frozen food from such foods. For example, frozen "sushi" produced by the present invention maintains the same degree of gelatinization (the quantity of α-starch) in its rice as rice boiled for preparing "sushi" before freezing.

What is claimed is:

1. A method for producing a frozen-food which comprises: forming an ice-capsule, in which the food, initially at room temperature, is chilled with a freezing medium of −80° C. to −100° C. so as to form an ice-capsule surrounding the food within 15 minutes; mildly chilling the food in an environment of −25° C. to −35° C. so that the temperature of the center of the food becomes about 0° C.; then quickly chilling the food with a freezing medium of −80° C. to −100° C. so that the temperature of the center of the food becomes about −6° C. or lower; chilling the food at a temperature of −25° C. to −35° C. for a period of time within the range of 40 to 90 minutes; and then storing the food at a temperature of −18° C. to −20° C.

2. The method for producing a frozen-food as claimed in claim 1, wherein the ice-capsule is formed by blowing a freezing gas medium onto the food sprayed with an aqueous solution.

3. The method for producing a frozen-food as claimed in claim 1, wherein the ice-capsule is formed by blowing a freezing gas medium into an aqueous solution in which the food is immersed.

4. The method for producing a frozen-food as claimed in claim 1, wherein the ice-capsule is formed by blowing a freezing gas medium directly onto the food.

* * * * *